(12) United States Patent
Dorricott et al.

(10) Patent No.: US 6,272,606 B1
(45) Date of Patent: Aug. 7, 2001

(54) AUTOMATED JOB SCHEDULING IN A DATA STORAGE AND/OR RETRIEVAL SYSTEM

(75) Inventors: Martin Rex Dorricott, Hampshire; Simon Chandler, Bath, both of (GB)

(73) Assignee: Sony United Kingdom Limited, Weybridge (GB)

(*) Notice: Subject to any disclaimer, the term of this patent is extended or adjusted under 35 U.S.C. 154(b) by 0 days.

(21) Appl. No.: 09/053,566

(22) Filed: Apr. 1, 1998

(30) Foreign Application Priority Data

Apr. 4, 1997 (GB) .................................................. 9706820

(51) Int. Cl.$^7$ ............................. G06F 12/00; B65G 1/00
(52) U.S. Cl. ........................................... 711/158; 711/111
(58) Field of Search ..................................... 711/158, 111, 711/112; 710/5, 6, 40, 43; 709/234; 700/214

(56) References Cited

U.S. PATENT DOCUMENTS

| | | | |
|---|---|---|---|
| 4,636,946 | * | 1/1987 | Hartung et al. ...................... 711/113 |
| 4,876,662 | * | 10/1989 | Pence ...................................... 365/78 |
| 4,974,197 | * | 11/1990 | Blount et al. ......................... 709/234 |
| 5,235,572 | | 8/1993 | Tamai ..................................... 369/30 |
| 5,469,560 | * | 11/1995 | Beglin .................................. 711/112 |
| 5,500,803 | * | 3/1996 | Munro et al. .......................... 360/92 |
| 5,664,143 | * | 9/1997 | Olbrich ................................. 711/112 |
| 5,890,208 | * | 3/1999 | Kwon .................................... 711/112 |

FOREIGN PATENT DOCUMENTS 0 482 802   4/1992 (EP) .
0 508 666   10/1992 (EP) .

OTHER PUBLICATIONS

Yu et al. Query Pre–Execution and Batching in Paradise. Technical Report, University of Wisconsin, Madison, Mar. 1996.*

Yu et al. Query Pre–Execution and Batching in Paradise. Scientific and Statistical Database Management, 1997;64–78.*

* cited by examiner

*Primary Examiner*—Do Hyun Yoo
*Assistant Examiner*—Yamir Encarnación
(74) *Attorney, Agent, or Firm*—Frommer, Lawrence & Haug, LLP.; William S. Frommer; Glenn F. Savit

(57) ABSTRACT

A method of scheduling data storage or retrieval jobs in a data storage and/or retrieval system in which stored data is distributed between multiple data storage volumes comprises:

(i) maintaining a queue of data storage or retrieval jobs for execution; and
(ii) adding a newly initiated job to the queue so that:
(a) if the newly initiated job requires access to the same data storage volume as a further job already in the queue, the newly initiated job is added to the queue at an adjacent queue position to that further job; and
(b) if the newly initiated job does not require access to the same data storage volume as any other job already in the queue, adding the newly initiated job to the queue at a queue position independent of the data storage volumes of other jobs in the queue.

10 Claims, 5 Drawing Sheets

AUTOMATED JOB SCHEDULING IN A DATA STORAGE AND/OR RETRIEVAL SYSTEM

BACKGROUND OF THE INVENTION

1. Field of the Invention

This invention relates to methods and apparatus for automated job scheduling in a data storage and/or retrieval system.

2. Description of the Prior Art

Centralised computer data storage and/or retrieval systems have been proposed in which the data storage and/or retrieval system is shared between many "client" computers—i.e. computers individually requiring to store or retrieve a quantity of data.

An example of such a system is a video archiving system for professional use—e.g. by a television broadcasting station. Here, a central archive of very many hours of video material might be stored on digital video tapes. Since the amount of archived material to be stored is likely to be very much more than can be fitted onto one tape, it has been proposed that an automated tape handling mechanism such as a robotic tape changer could be used. A robotic tape changer of this type is typically able to unload a tape cassette from a tape recording/replay machine (e.g. a video tape recorder or VTR), to return the tape cassette to the correct place in a tape cassette shelving or racking system, to pick up the next tape cassette from the racking system and to load it into the VTR.

However, these operations all take time. There is a certain amount of time associated with the actions of the robotic changing mechanism, and also a significant (and often much greater) amount of time needed to rewind and unload a current tape cassette, and then to load and cue up a next tape cassette. These time penalties would be present simply because a storage medium based on multiple storage volumes (tape cassettes) is in use; the robotic arrangement simply adds to the already-existing problem.

So, there is a need to reduce, wherever possible, the time taking in accessing data held on a multi-volume storage medium.

SUMMARY OF THE INVENTION

This invention provides a method of scheduling data storage or retrieval jobs in a data storage and/or retrieval system in which stored data is distributed between multiple data storage volumes, the method comprising:

(i) maintaining a queue of data storage or retrieval jobs for execution; and (ii) adding a newly initiated job to the queue so that:

(a) if the newly initiated job requires access to the same data storage volume as a further job already in the queue, the newly initiated job is added to the queue at an adjacent queue position to that further job; and (b) if the newly initiated job does not require access to the same data storage volume as any other job already in the queue, adding the newly initiated job to the queue at a queue position independent of the data storage volumes of other jobs in the queue.

In this way, the invention can optimise or at least improve the way in which data storage and retrieval jobs are added to a job queue, by ensuring that where possible a newly added job is added to the queue at a queue position adjacent to a job requiring access to the same data storage volume. This can avoid the need to unload and reload a data storage volume between execution of the two jobs, so saving the time associated with those operations.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
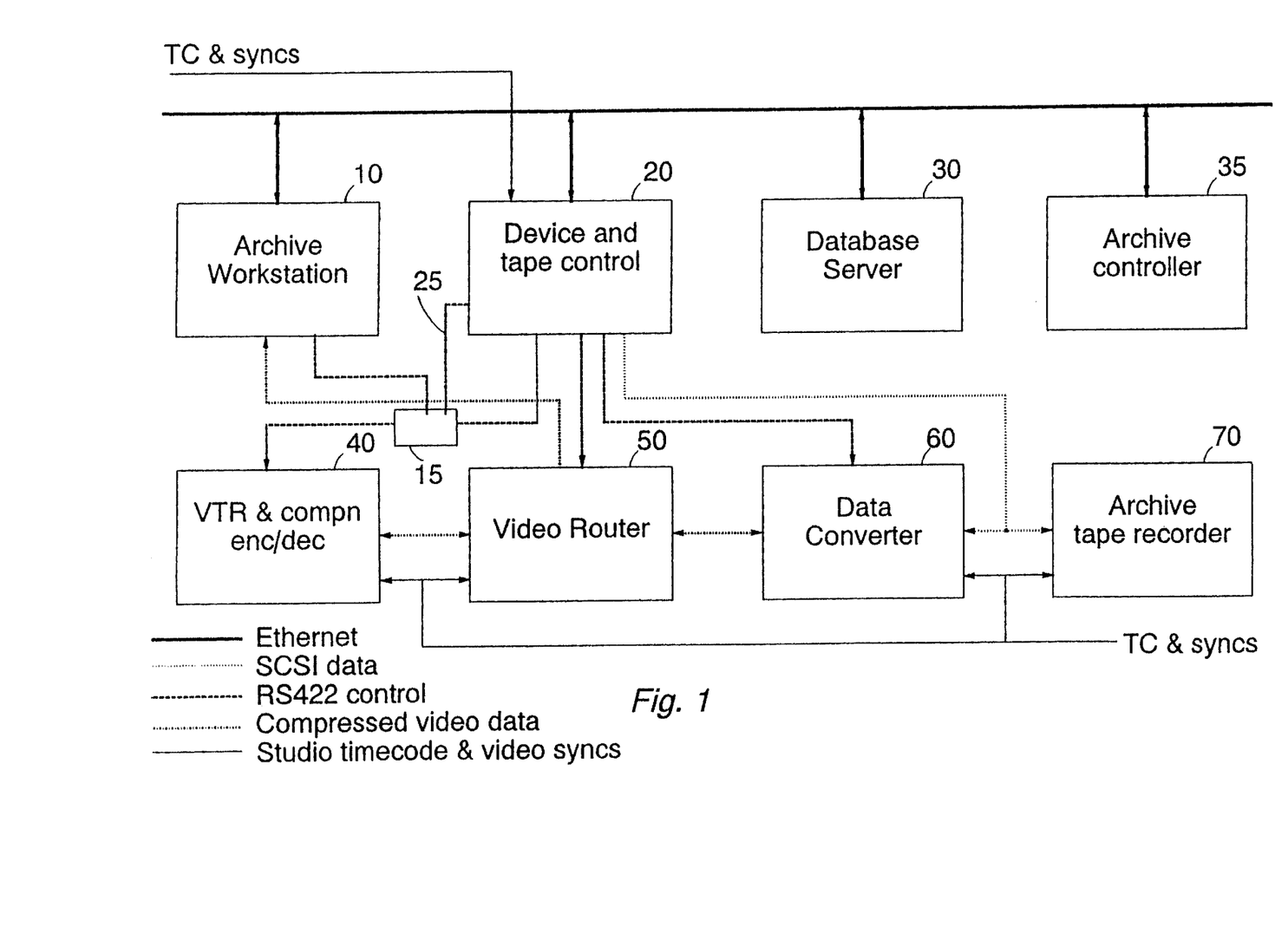
FIG. 1 is a schematic diagram of a video archiving system.

FIG. 1 is a schematic diagram of a video archiving system.

The system comprises an archive workstation 10, a device and tape control computer 20, a database server 30 and an archive controller 35, all linked by an ethernet local area network (LAN) connection, an RS-422 router 15, a video cape recorder (VTR) 40, a video (and audio) router 50, a data converter 60 and an archive tape recorder 70.

The archive controller 35 controls and coordinates the overall operation of the device and tape controller 20, and communicates with the database server (to consult or modify the database held on that server) and with the archive workstation (to receive commands relating to data storage or retrieval jobs in which video and audio data is transferred to or from the archive tape recorder).

The database server holds a database of the archived material (see below). The device and tape controller 20 responds to commands issued by the archive controller to generate specific RS-422 or SCSI commands to drive the controlled devices 40, 50, 60, 70 (and possibly other similar devices—not shown).

The RS-422 router is operable to route RS-422 commands to the VTR from either the device and tape controller 20 or the archive workstation 10.

The archive tape recorder is a composite term representing a tape record/replay device and a known robotic system for loading tapes into the tape record/replay device. The tape record/replay device receives SCSI commands to control its operation, and the robotic system is controlled by RS-422 commands from the device and tape controller.

Finally, each archive workstation is available for use by a human archivist in preparing material for archive, preparing corresponding entries in the database. browsing the database and initiating retrieval of archived material from the archive tape recorder. The archive workstations are in effect the "client", in that they communicate high level archiving tasks to the archive controller, which then schedules and carries out those tasks—e.g. by instructing the device and tape controller 20.

The archiving system works in two main modes of operation. When incoming video material (with or without accompanying audio material) is to be archived. the material is replayed from the VTR 40 and viewed at the archive workstation 10. A human operator (referred to as the archivist) then assigns a title, various keywords, an abstract and other information to the video material. This additional information forms a database entry which is stored in a database maintained on the database server 30. In the meantime, a storage job is initiated to store the video material on the archive tape recorder 70. This "archive creation" process will be described in more detail below.

In a second ("archive retrieval") process, the human operator uses the archive workstation 10 (or another workstation connected to the network) to browse through the database entries held on the database server 30. For example, the user might be searching for video material having a particular associated keyword. When the user finds one or more pieces of video material in this manner which he believes are appropriate to the current requirements, he can initiate a retrieval job to retrieve that video material from the archive tape recorder.

These two processes will now be described in more detail.

Archive Creation

In this mode of operation, incoming video material is replayed from the VTR (for example, a Sony Digital Beta-Cam video tape recorder) and is encoded into a known compressed video format (the so-called MPEG II 4:2:2 P@ML format). The compressed video is supplied in a known data transmission format known as "SDDI" via the router 50 to the archive workstation 10, where it can be viewed by the archivist.

At this archive creation stage, the routing applied by the video router 50 is controlled by the device and tape control computer 20, which in turn responds to commands by the archive workstation 10. However, for rapid control by the human operator, the RS-422 commands which control the VTR 40 are routed, via the RS-422 router, directly from the archive workstation 10 to the VTR 40. So, as a first step, the device and tape controller 20 uses an RS-422 control line 25 to set up the RS-422 router to patch RS-422 commands from the archive workstation to the VTR, and from then on during the archive creation process the commands are passed directly. Thus, if the archivist wishes to replay a particular portion of the tape, he makes the appropriate commands at the archive workstation 10, which are communicated via RS-422 router to the VTR 40 using a conventional RS-422 control protocol.

The archivist replays through the material to be archived, perhaps several times over to gain a full understanding and familiarity with the events covered by the video material. The archivist is presented with software-generated database entry forms on the screen of the archive workstation 10, at which the archivist can enter information to be used in classifying that video material. This information forms a database entry to be added to a conventional database maintained on the database server 30.

When the database entry has been prepared, the video material is transferred from the VTR 40, via the router 50 to the data converter 60. In doing this, the archive controller instructs the device and tape controller to set up the relevant devices, including setting up the RS-422 router now to route RS-422 commands from the device and tape controller to that VTR, and then to issue the necessary operating commands to set the VTR into play mode and the archive tape recorder into a record mode. The data converter 60 receives the video data in the SDDI synchronous transmission format and outputs the video data to the archive tape recorder 70 in a SCSI data transfer format.

Because the nature of the SCSI transmission format does not tend to allow data transfer operations to be initiated and started quickly enough for a synchronous video data transfer, the data converter 60 contains a large buffer memory (not shown) to provide any necessary delay to the data being passed to or from the data converter 60.

The archive tape recorder itself (at least the record/replay device) is a helical scan digital tape recorder such as the Sony GY10 tape recorder. This device is primarily a "data" recorder, and so will accept data other than video data, but it is noted that in this embodiment the bulk of the material stored on the archive tape recorder is in fact video data.

The video data and certain other data is then recorded on the archive tape recorder 70. Specifically, the video data is routed as described above from the VTR 40, via the router 50 to the data converter 60 and finally to the archive tape recorder 70; and the other associated data (e.g data derived from the database entry for that material) is routed from the database server 30 to the device and tape controller 20 via the LAN, and then from the device controller 20 to the archive tape recorder 70 via the SCSI link.

In a typical application, there is a very large amount of video data to be archived in this way, so a robotic library system is used in associated with the archive tape recorder 70. It is very likely that a large number of tapes will be required, and so the database entry for the video material archived on a particular tape (which is stored in the database server 30) also contains a tape identifier which identifies the appropriate tape (or tapes, if multiple copies are made) on which that material is stored.

Archive Retrieval

The first step in an archive retrieval operation is to identify the appropriate piece of video material to be retrieved. The user can do this by browsing through the database stored on the database server 30 from a computer workstation (such as the archive workstation 10) connected via the ethernet link to the database server 30. This searching mechanism may be conventional, using key words, title information or abstract text to search for a required piece of video material.

Once the required material has been identified, the user can issue a command which is transmitted via the ethernet link to the archive controller, which in turn issues a command to the device and tape control computer 20 to retrieve the required video data from the archive tape recorder 70. Executing these commands will include setting up the SCSI link between the archive tape recorder and the data converter, setting up the RS-422 links between the other devices, and issuing correctly timed commands to initiate play and record modes of the devices.

These commands are not necessarily executed straight away. It is intended that the archive store will be shared by many users—perhaps within a television broadcasting station, so there could be many competing storage and retrieval jobs to be done. For this reason, a queue of jobs is maintained, and jobs are executed in the queue order. This will be described below in more detail.

When a command is executed to retrieve data from the archive tape recorder, it is first necessary to have the correct tape placed in the archive tape recorder 70 (e.g. by the robotic library system—not shown). Then, the device and tape control computer 20 sets up the SCSI link from the archive tape recorder to the data converter and issues appropriate RS-422 commands to the data converter, the router and the VTRs 40 so that the video data is replayed from the archive tape recorder 70, communicated via the SCSI link to the data converter 60, converted into an SDDI synchronous transmission format, and then supplied via the router 50 to the VTR 40 for recording. The material can then be viewed, either during this process or later from the VTR, at one of the computer workstations.

Figure 2:
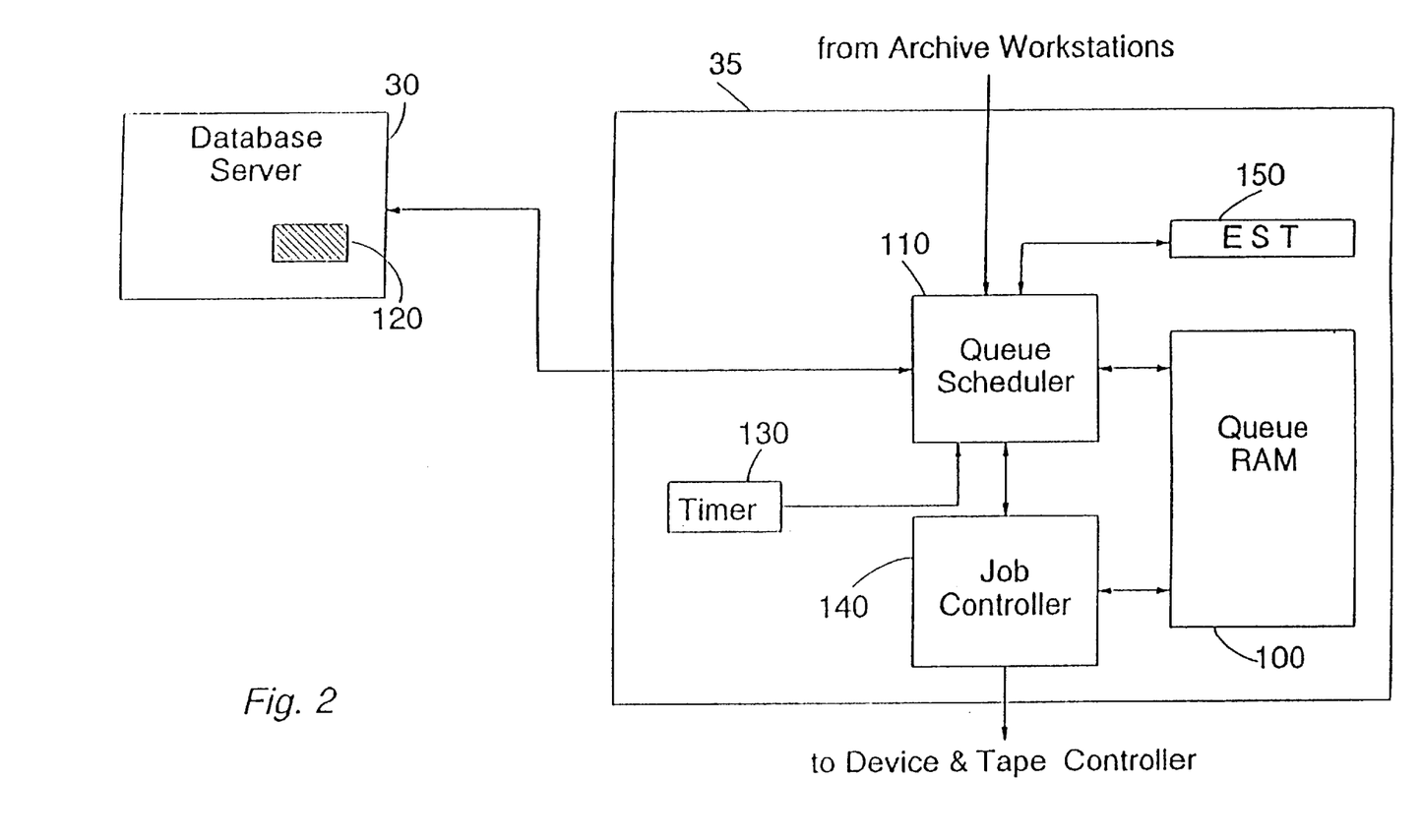
FIG. 2 is a schematic diagram showing a part of an archive controller.

FIG. 2 is a schematic diagram showing a part of the archive controller 35.

The archive controller 35 maintains a queue of data accessing "jobs" for transferring data to or from the archive tape recorder 70. The queue will be described in more detail with reference to FIG. 3, but for the purposes of FIG. 2 the queue is maintained in a queue memory (RAM) 100.

Details of the jobs to be added to the queue are sent via the ethernet link from the archive workstation 10 (or another client workstation) to a queue scheduler 110 within the archive controller 35. The job details received by the queue scheduler from the archive workstation (in the example of a data retrieval job) comprise the following information:

job priority (high, medium or low, assigned by the user) tape volume;
  material unique reference number (URN) defining the required material on the database;
  identification of the user making the request;
  a required latest job completion time (RCT); and
  a required earliest job completion time (ECT).

These are all items of information available to the archive workstation during a database-browse operation, and so when the user initiates a data retrieval job they are simply packaged together for transmission to the archive controller as a job request.

The queue scheduler sends a request by the ethernet link to the database server at this stage. This serves two purposes. The first is to retrieve information from the database server translating the material URN into a file and index reference for that tape volume—effectively a position along the tape where the required material will be found—and obtaining a time duration corresponding to that material. The second purpose is to set up a log entry 120 within the database server. The log entry is simply a record that the job has been created, and is maintained by the database server until it is purged or deleted by the user (which may be well after the completion of the job). The job records 120 can therefore form a record of the usage of individual clips of video material—for example, for assessing copyright royalties to be paid.

The queue scheduler 110 then adds the jobs to the queue of jobs held in the queue RAM 100. The way in which a new job is added to the queue is described below with reference to FIG. 4.

The queue scheduler also maintains an estimated start time (EST) register 150, which contains an estimate of the time at which the currently executing job will finish—i.e. the time at which the next job can start.

Each job has a job duration associated with it. This is a sum of three times: a setup time for loading a tape and shuttling to the correct position; a data transfer time for actually transferring the audio and video data to or from the tape (this is equal to the real-time duration of the material divided by the transfer rate. In this embodiment, audio and video data are transferred to or from the tape at 4× real-time, so this factor is 4), and a closedown time for returning the tape to the required storage position and ejecting the tape.

From time to time, the queue scheduler checks that the queue is in its optimum order to comply with the time constraints imposed by individual jobs. In this embodiment, the queue scheduler carries out this task (which will be described below with reference to FIG. 5)

(a) when a new job is entered onto the queue;
  (b) when a job completes; and
  (c) in any event, every ten seconds under the control of an interrupt timer 130.

A job controller 140 operates whenever a current job has completed to take the next job from the head of the queue and to transmit information specifying the job to the device and tape controller 20 via the ethernet link.

Figure 3:
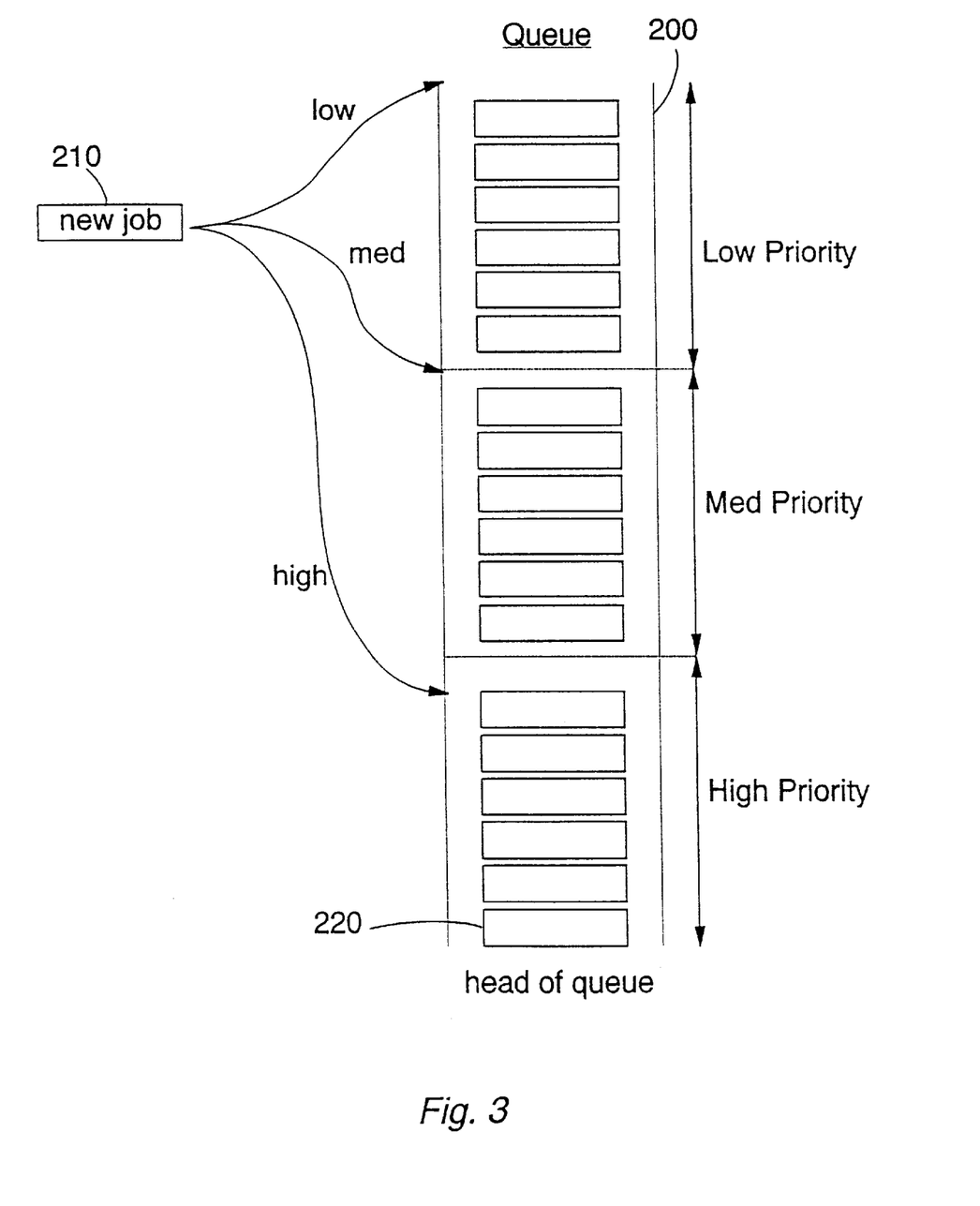
FIG. 3 schematically illustrates a job queue.

FIG. 3 schematically illustrates the job queue 200 maintained in the queue RAM 100.

The queue 200 is logically arranged as three ordered sections, containing low priority jobs, medium priority jobs and high priority jobs respectively. When a new job 210 is to be added to the queue, it is added somewhere in the appropriate section depending on the priority given by the user to that new job. So, it a new job has been assigned a "medium" priority, it will be added co the queue somewhere in the medium priority section of the queue, and will never move into another priority section.

Jobs are not always added to the back of the corresponding section of the queue; under some circumstances they can be added part way through the relevant section. This possibility will be discussed below with reference to FIG. 4.

The "head" of the queue in FIG. 3 is shown at the bottom of the page. Thus, as the queue currently stands, the next job to be executed (after the current job completes) is the job at the head of the queue, namely a job 220. After that, other jobs held in the high priority section of the queue will be executed, in the queue order. Medium priority jobs always lie behind high priority jobs in the queue, so that as long as there is one or more high priority jobs still to be executed, no medium priority jobs will be executed. Similarly, in order for a low priority job to be executed—even the low priority job at the head of the low priority section of the queue—there must be no medium priority or high priority jobs waiting to be executed.

Figure 4:
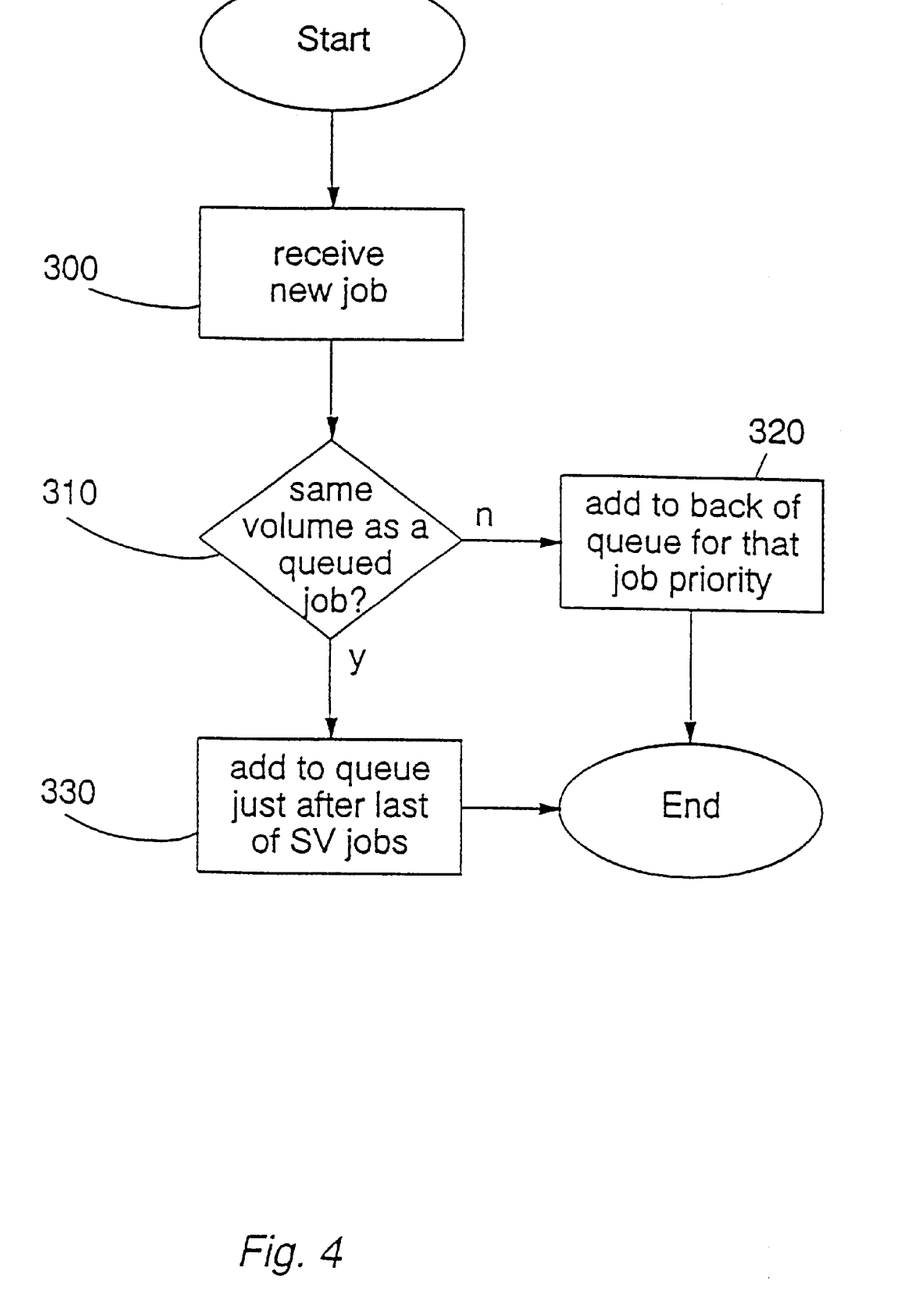
FIG. 4 is a schematic flow chart showing the addition of a new job to the job queue.

FIG. 4 is a schematic flow chart showing the addition of a new job 210 to the job queue 200.

The new job is received from the archive workstation or another client workstation at a step 300. In this step, the interaction with the database server to set up the job record and to obtain the file and index details also takes place as described above.

At a step 310, the other jobs in the appropriate priority section of the queue for the new job 210 are checked to detect whether any job in that priority section of the queue requires access to the same tape volume as the new job 210.

If the answer to this question is negative, then the new job 210 is simply added to the back of the queue for that priority section of the queue. This takes place at a step 320. So, for example, if the new job 210 is a medium priority job, and its tape volume is not the same as the required tape volume for any existing job in the medium priority section of the queue 200, then the step 320 would involve adding the new job 210 as the last job in the medium priority section of the queue.

If, however, the new job 210 does have the same required tape volume as one of the existing jobs in that priority section of the queue, then the new job 210 is added (at a step 330) to the queue immediately after the last of the existing jobs using the same tape volume.

An example of this process will now be described.

Example of Volume-based Queue Reordering

Consider a priority section of a queue containing the following four jobs:

| |
|---|
| Job A (vol 1) |
| Job B (vol 1) |
| Job C (vol 2) |
| Job D (vol 4) |
| (head of queue) |

A new job, job E, is received and must be placed in the queue. If job E were just placed at the back of the appropriate priority section of the queue, the order would look like this:

| |
|---|
| Job E (vol 4) |
| Job A (vol 1) |
| Job B (vol 1) |
| Job C (vol 2) |
| Job D (vol 4) |
| (head of queue) |

However, this is considered wasteful of resources, as tape volume 4 has to be loaded, unloaded, loaded and unloaded again within a space of four jobs. Loading and unloading a tape volume can take up to about 7 minutes in the present embodiment.

So, to reduce the overhead time spent loading and unloading tape volumes, the new job E is initially positioned in the queue just after another job (job D) which also uses tape volume 4. This means that the two jobs can be carried out successively without having to unload and reload the tape volume. The new queue order is as follows:

| |
|---|
| Job A (vol 1) |
| Job B (vol 1) |
| Job C (vol 2) |
| Job E (vol 4) |
| Job D (vol 4) |
| (head of queue) |

Figure 5:
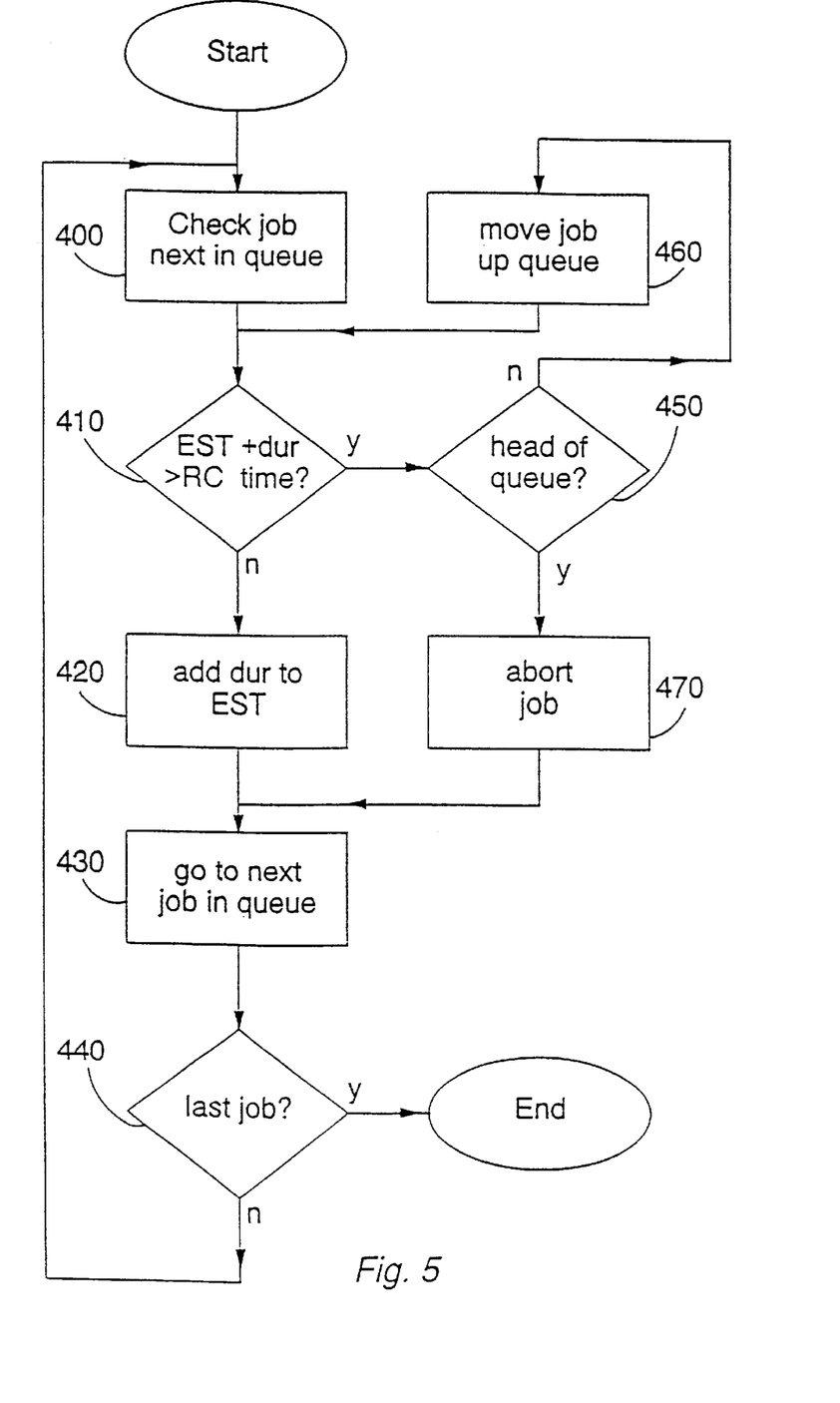
FIG. 5 is a schematic flow chart showing the sorting of jobs within the queue to comply with time constraints.

FIG. 5 is a schematic flow chart showing the sorting of jobs within the queue to comply with time constraints.

As mentioned above, the process of FIG. 5 is carried out
(a) when a new job is entered onto the queue;
(b) when a job completes; and
(c) in any event, every ten seconds under the control of the interrupt timer 130.

Each time the process is carried out, the queue is scanned from the head of the queue backwards (i.e. towards the back of the queue). By definition, this involves scanning the high priority section of the queue first, followed by jobs in the medium priority section of the queue, followed by jobs in the low priority section of the queue. The scanning process and possible reordering can change the order of jobs within a priority section of the queue, but in this embodiment a job cannot change from one priority section to another. In other words, the job at the head of the medium priority section of the queue could never be promoted to the high priority section of the queue, whatever time constraints needed to be fulfilled.

So, referring to FIG. 5, the job next in the queue is checked at a step 400. On the first run through the process of FIG. 5, this will be the job at the head of the queue.

At a step 410, a check is made to detect whether the estimated earliest start time (EST) added to the estimated duration of the job being checked falls after any required completion time specified in that job.

If the answer to the question of step 410 is no, this means that the job being checked can be executed before its required completion time and so there is no need to move the job to a higher position within the queue. The estimated duration of the job currently being checked is then added to a "running total" earliest start time at a step 420. This gives an estimate of the earliest start time of the next job in the queue. Then, at a step 430, the check is moved to the next job in the queue. At a step 440, if there is in fact no next job (i.e. the last job in the queue has just been checked) then the process ends. Otherwise, the process returns to step 400 described above.

Returning to the step 410, if the earliest start time (the running total) plus the estimated duration of the job currently being checked is in fact after the required completion time of the job currently being checked then control passes to a step 450.

At the step 450, a check is made as to whether the job currently being considered is at the head of the respective priority section of the queue. If so, then the job cannot be completed within the time constraints specified when the job was initiated, and so the job is aborted. (In fact, aborting the job at the head of the queue is deferred until the currently executing job is complete, so that if the currently executing job finishes earlier than its estimated completion time, possibly leaving time for the next job to be completed, the next job can go ahead.)

At the step 450, if the currently considered job is not at the head of the queue in that priority section, it is moved one place up the queue at a step 460. Control then returns to the step 410, where the EST plus the estimated duration of the job is compared with the required completion time of the job.

So, the sorting process of FIG. 5 can rearrange jobs within the queue in order to try to satisfy all of the time constraints associated with the jobs. If a job's time constraint cannot be satisfied, then the job is aborted.

Example of Time-based Queue Reordering

Consider a queue containing the following four jobs:

| |
|---|
| Job A (vol 1) |
| RCT = 11:05; dur = 12 min |
| Job B (vol 1) |
| dur = 8 min |
| Job C (vol 2) |
| dur = 17 min |
| Job D (vol 4) |
| RCT = 10:55; dur = 6 min |
| (head of queue) |

In this example, the estimated earliest start time (EST) for the next job in the queue is 10:45.

In the queue's present form, the scheduler detects that job A will fail, by the following reasoning.

The earliest start time for job D is 10:45. Job D has an estimated duration of 6 minutes, so the estimated completion time of job D is 10:51. (This is before the required latest completion time of 10:55, so the scheduler would not detect a problem with the currently scheduled position of job D).

If job D is estimated to finish at 10:51, then this would also be the earliest start time for job C. Job C has an estimated duration of 17 minutes, so the estimated finish time of job C (and so the earliest start time of job B) is 11:08. Job B has an estimated duration of 8 minutes, so the estimated finish time of job B is 11:16.

So, by this reasoning, job A could not even start until 11:16, and so could not possibly complete by the required completion time of 11:05. Therefore, job A must be moved up the queue.

Moving job A one place up the queue, so that the queue is reordered as Job D; Job C; Job A; Job B, is not sufficient. This would still give an estimated start time for job A of 11:08—after the required completion time of job A. However, moving job A two places up the queue allows the time requirements for job A to be complied with, while not violating the requirements of job D. The revised queue is as follows:

---

Job B (vol 1)
dur = 8 min
Job C (vol 2)
dur = 17 min
Job A (vol 1)
before 11:05; dur = 12 min
Job D (vol 4)
before 10:55; dur = 6 min
(head of queue)

---

Here, job D is estimated to start at 10:45 and to finish by 10:51. Job A is estimated to start at 10:51 and to finish by 11:03. Job C is estimated to start at 11:03 and to finish by 11:17. Finally, job B is estimated to start at 11:17 and to finish by 11:25.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. An automated method of scheduling data storage or retrieval jobs in a data storage and/or retrieval system in which stored data is distributed between multiple data storage volumes, said method comprising:
   (i) maintaining a plurality of queues of data storage or retrieval jobs for execution, each of said queues having a distinct execution priority type; and
   (ii) determining which one of said queues has an execution priority type that matches a user-assigned priority type for a newly initiated job, and adding said newly initiated job to said one queue so determined so that:
      (a) if said newly initiated job requires access to the same data storage volume as a further job already in said one queue, said newly initiated job is added to said one queue at an adjacent queue position to that further job; and
      (b) if said newly initiated job does not require access to the same data storage volume as any other job already in said one queue, adding said newly initiated job to said one queue at a queue position independent of the data storage volumes of other jobs in said one queue.

2. A method according to claim 1, in which step (ii) (a) comprises adding said newly initiated job at a queue position after the queue position of said further job.

3. A method according to claim 1, wherein more than one of said queues each has a plurality of jobs associated with a respective plurality of said data storage volumes.

4. An automated method of scheduling data storage or retrieval jobs in a data storage and/or retrieval system in which stored data is distributed between multiple data storage volumes, said method comprising:
   (i) maintaining a queue of data storage or retrieval jobs for execution; and
   (ii) adding a newly initiated job to said queue so that:
      (a) if said newly initiated job requires access to the same data storage volume as a further job already in said queue, said newly initiated job is added to said queue at an adjacent queue position to that further job; and
      (b) if said newly initiated job does not require access to the same data storage volume as any other job already in said queue, adding said newly initiated job to said queue at a queue position independent of the data storage volumes of other jobs in said queue;
   wherein each queued job has an associated estimated duration and selectively has an associated required latest completion time that was assigned to the job prior to a user-initiated job request for the job, and said method further comprising:
      maintaining an estimated start time for the job at the head of said queue;
      predicting a completion time for each job in said queue on the basis of said estimated start time of said job at the head of said queue and the estimated durations of jobs in said queue; and
      if the predicted completion time for a job is after the required latest completion time for that job, moving that job to a higher position within said queue.

5. A method according to claim 4, wherein said queue is a section in a larger storage of data retrieval or storage jobs, said section having a predetermined execution priority type, and the newly initiated job is added to said queue only if it has a user assigned priority type that matches the predetermined priority type of said queue.

6. A method according to claim 4, further comprising aborting a job if it is determined that the required completion time therefor cannot be met based upon the predicted completion time therefor.

7. Job scheduling apparatus for scheduling data storage or retrieval jobs in a data storage and/or retrieval system in which stored data is distributed between multiple data storage volumes, said apparatus comprising:
   (i) means for maintaining a plurality of queues of data storage or retrieval jobs for execution each of said queues having a distinct execution priority type; and
   (ii) means for determining which one of said queues has an execution priority type that matches a user-assigned priority type for a newly initiated job, and adding said newly initiated job to said one queue so determined so that:
      (a) if said newly initiated job requires access to the same data storage volume as a further job already in said one queue, said newly initiated job is added to said one queue at an adjacent queue position to that further job; and
      (b) if said newly initiated job does not require access to the same data storage volume as any other job already in said one queue, said newly initiated job is added to said one queue at a queue position independent of the data storage volumes of other jobs in said one queue.

8. The job scheduling apparatus according to claim 7, wherein each queued job has an associated estimated duration and selectively has an associated required latest completion time that was assigned to the job prior to a user-initiated job request for the job, and said apparatus further comprising:

means for maintaining an estimated start time for the job at the head of said queue;

means for predicting a completion time for each job in said queue on the basis of said estimated start time of said job at the head of said queue and the estimated durations of jobs in said queue; and if the predicted completion time for a job is after the required latest completion time for that job, that job is moved to a higher position within the queue.

9. A job scheduling apparatus according to claim 8, further comprising means for aborting a job if it is determined that the required latest completion time therefor cannot be met based on the predicted completion time therefor.

10. A job scheduling apparatus according to claim 7, wherein more than one of said queues each has a plurality of jobs associated with a respective plurality of said data storage volumes.

* * * * *